(12) United States Patent
James

(10) Patent No.: US 10,550,964 B2
(45) Date of Patent: Feb. 4, 2020

(54) METHODS AND ASSEMBLIES FOR PIE CUTS

(71) Applicant: Jesse Gregory James, Austin, TX (US)

(72) Inventor: Jesse Gregory James, Austin, TX (US)

( * ) Notice: Subject to any disclaimer, the term of this patent is extended or adjusted under 35 U.S.C. 154(b) by 36 days.

(21) Appl. No.: 15/962,760

(22) Filed: Apr. 25, 2018

(65) Prior Publication Data

US 2018/0313472 A1 Nov. 1, 2018

Related U.S. Application Data

(60) Provisional application No. 62/490,719, filed on Apr. 27, 2017.

(51) Int. Cl.
| | | |
|---|---|---|
| *F16L 9/22* | (2006.01) | |
| *B21C 37/08* | (2006.01) | |
| *F16L 43/00* | (2006.01) | |
| *F01N 13/00* | (2010.01) | |
| *F01N 13/18* | (2010.01) | |
| *F16L 13/02* | (2006.01) | |

(52) U.S. Cl.
CPC ............... *F16L 9/22* (2013.01); *B21C 37/08* (2013.01); *F01N 13/00* (2013.01); *F01N 13/1816* (2013.01); *F16L 43/001* (2013.01); *F16L 13/0209* (2013.01)

(58) Field of Classification Search
CPC ..... F16L 19/22; F16L 43/001; F16L 13/0209; F01N 13/00; F01N 13/1816; B21C 37/08
USPC .......................................................... 138/120
See application file for complete search history.

(56) References Cited

U.S. PATENT DOCUMENTS

| | | | | |
|---|---|---|---|---|
| 2,823,703 A * | 2/1958 | Nusser, Jr. | ............... | F16L 11/18 285/181 |
| 4,594,734 A * | 6/1986 | Vykukal | ................... | B64G 6/00 138/120 |
| 4,800,985 A * | 1/1989 | Hanzawa | ........... | F02M 35/1222 181/229 |
| 4,807,370 A * | 2/1989 | Trimble | .............. | F16L 27/0849 138/120 |
| 5,473,815 A * | 12/1995 | Sonden | ................. | F16L 13/163 29/890.149 |
| 7,097,804 B2 * | 8/2006 | Frantz | .................. | B29D 23/006 264/285 |
| 7,360,799 B1 * | 4/2008 | Price | ........................ | F16L 59/22 138/149 |
| 8,047,236 B2 * | 11/2011 | Perry | ................... | A61B 1/0055 135/155 |
| 9,476,538 B2 * | 10/2016 | Kim | ....................... | F16L 59/024 |
| 10,323,711 B2 * | 6/2019 | Rollins | .................... | F16F 7/003 |
| 2005/0056333 A1 * | 3/2005 | Utaki | ................... | H02G 11/006 138/120 |
| 2009/0293979 A1 * | 12/2009 | Scott | ......................... | F16L 9/22 138/98 |
| 2014/0345739 A1 * | 11/2014 | Graham | ................ | F16L 11/083 138/120 |

* cited by examiner

*Primary Examiner* — Craig M Schneider
*Assistant Examiner* — David R Deal
(74) *Attorney, Agent, or Firm* — Matthew Burr

(57) ABSTRACT

Pre-manufactured pie cut pieces provide internal cutouts such that the cutouts from one piece are complementary to the cutouts of an adjacent piece so that the pieces connect by an interlocking friction fit. A series of pie cut pieces can be connected this way in concatenated fashion to produce a section of curved piping. The joints between the joined pieces can be sealed by welding or other suitable sealing means.

1 Claim, 5 Drawing Sheets

METHODS AND ASSEMBLIES FOR PIE CUTS

CROSS-REFERENCE TO RELATED APPLICATIONS

The present application is related to, is a continuation-in-part of, claims the benefit of and priority from United States provisional patent application of the same title and by the same inventor, Ser. No. 62/490,719, filed Apr. 27, 2017, the disclosure of which is incorporated by reference.

TECHNICAL FIELD

The present invention deals generally with pipe bending and metal working. More particularly, it deals with pre-manufactured pie cuts that assemble to create pipe bends.

BACKGROUND

An exhaust pipe typically directs exhaust gasses collected from a manifold, for instance, away from the vehicle generating the gasses, typically, for example, to the rear or the direction opposite the direction of travel. Commonly, the exhaust pipe is a straight pipe that leads directly from the engine to the rear of the vehicle. Makers of custom automobiles, motorcycles, and internal combustion engines, however, sometimes orient the engine so that the exhaust pipe is connected at a location such that the pipe is not directed backward toward the rear. This may occur for aesthetic or performance reasons. In such cases, it is necessary to bend the exhaust pipe so that it directs the exhaust gasses in a safe direction.

Bending pipe is a surprisingly tricky thing to do, requiring a fair amount of skill and special equipment such as a pipe bender. One alternative to bending pipe is to cut a section of pipe into series of pie cut pieces that can be assembled and welded together to form a curved section of piping. Making pie cuts, however, is also tricky and requires a fairly high degree of skill and experience, as well as welding capability. In recent years, pie cut pipe bends have become fashionable because they look cool and make it relatively easy to bend the exhaust pipe into artistic shapes. Until now, pie cuts were custom-made for each specific job, even though exhaust pipe piping is commonly of standardize diameter and thickness.

There is an unmet need therefore, for pre-manufactured pie cut pieces where each piece has a structural feature by which the separate pie cut pieces snap or otherwise lock together to more easily form any desired curved section of piping.

SUMMARY

Pre-manufactured pie cut pieces provide internal cutouts such that the cutouts from one piece are complementary to the cutouts of an adjacent piece so that the pieces connect by an interlocking friction fit. A series of pie cut pieces can be connected this way in concatenated fashion to produce a section of curved piping. The joints between the joined pieces can be sealed by welding or other suitable sealing means.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In the following discussion and in the claims, the terms "including" and "comprising" are used in an open-ended fashion, and thus should be interpreted to mean "including, but not limited to." Also, the term "connect" or "connected" or equivalent term where used if at all is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

Figure 1:
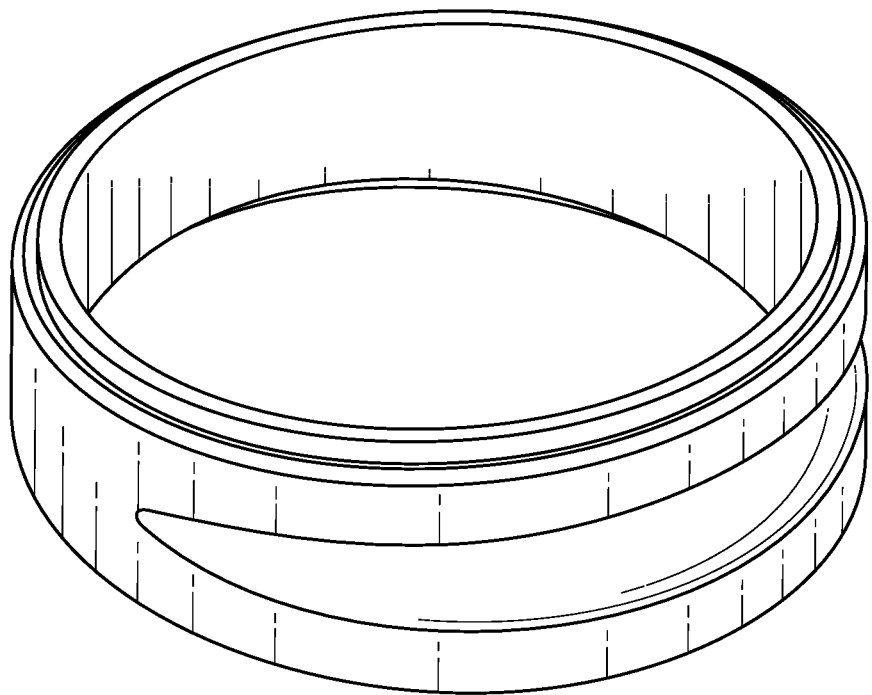
FIG. 1 is an isometric oblique view of a pie cut section of the present invention.

FIG. 1 is an isometric oblique view of a pie cut section of the present invention.

Figure 2:
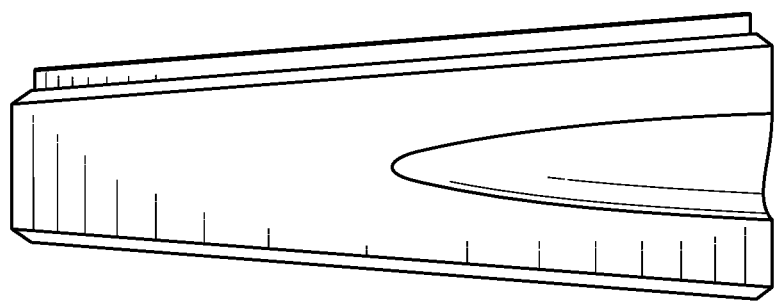
FIG. 2 is a side view of the pie cut section of FIG. 1 with bottom angle of 4.5 degrees and section line C-C.

FIG. 2 is a side view of the pie cut section of FIG. 1 with bottom angle (1) and top angle (2), both of 4.5 degrees, and section line C-C.

Figure 3:
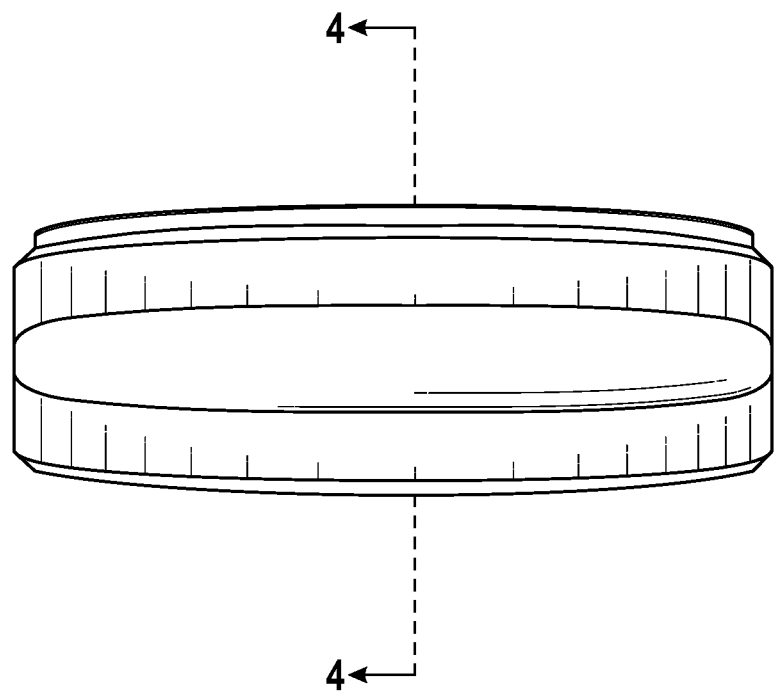
FIG. 3 is a side view of the pie cut section of FIG. 1 with top angle of 4.5 degrees and section line A-A.

FIG. 3 is a side view of the pie cut section of FIG. 1 with top angle of 4.5 degrees and section line A-A. Horizontal tear drop shape detail (3) is cut out of the exterior surface, also referred to herein sometimes as the outside wall, of the section material.

Figure 4:
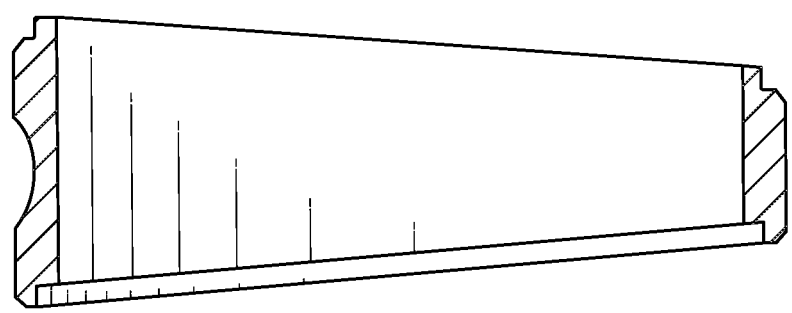
FIG. 4 is a sectional view along section line A-A of the pie cut section of FIG. 3 with radius horizontal tear drop detail cut.

FIG. 4 is a sectional view along section line A-A of the pie cut section of FIG. 3 with radius horizontal tear drop detail cut. The angled cut of the piece defines a narrow end and a wide end. The outside wall (4) and the inside wall (5) are called out on the wide side of the piece to help orient the reader. The narrow side of the section provides interlocking step (6) on the outside wall (4) and the wide interlocking step (7) on inside wall (5).

Figure 5:
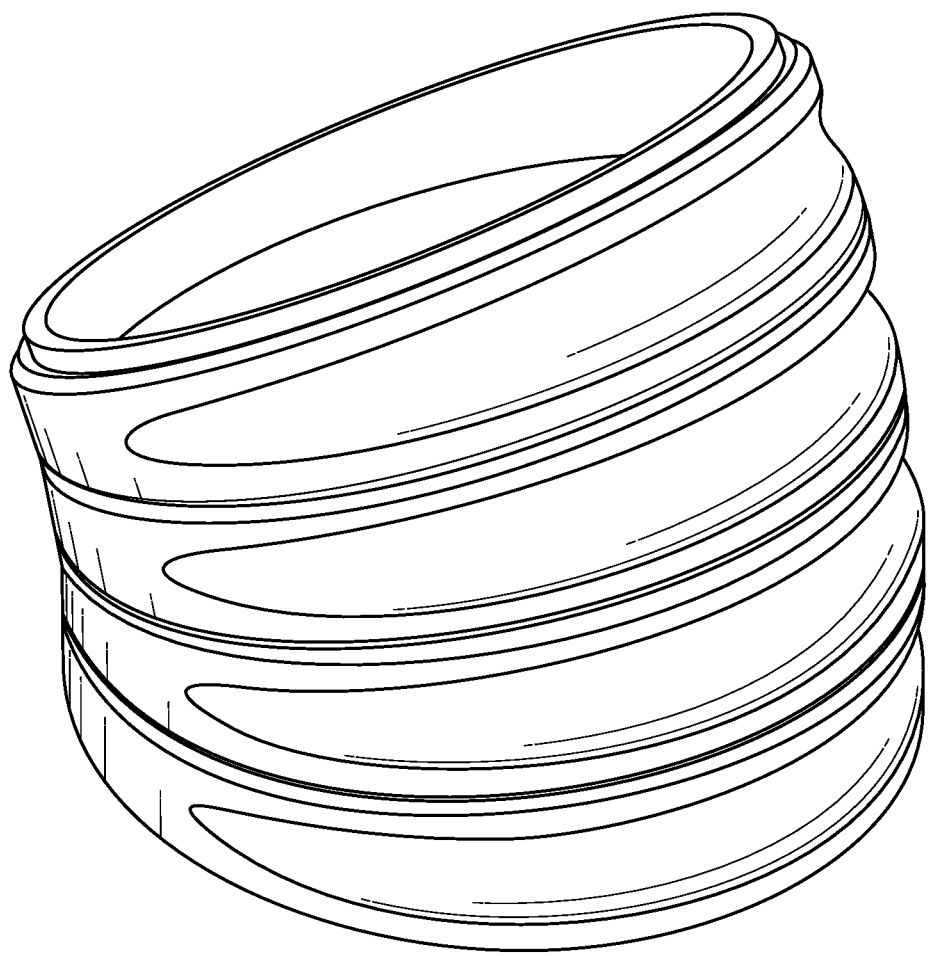
FIG. 5 is an isometric oblique view of a stack of interlocked pie cut sections of the present invention.

FIG. 5 is an isometric oblique view of a stack of interlocked pie cut sections of the present invention.

Figure 6:
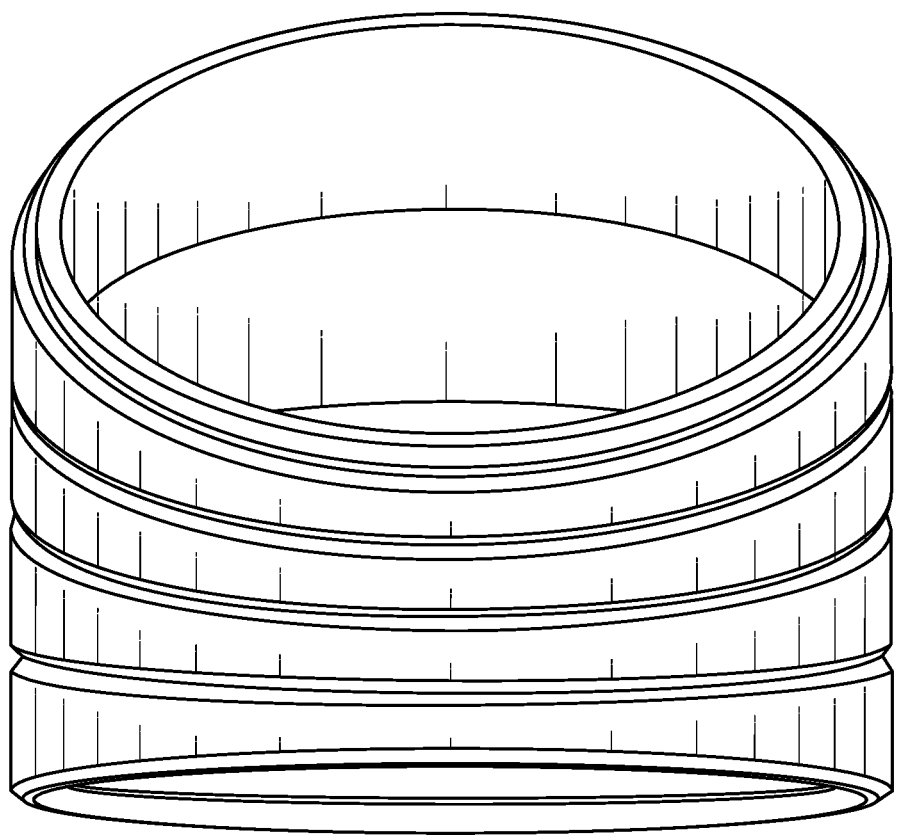
FIG. 6 an isometric front view of the stack of FIG. 5.

FIG. 6 an isometric front view of the stack of FIG. 5.

Figure 7:
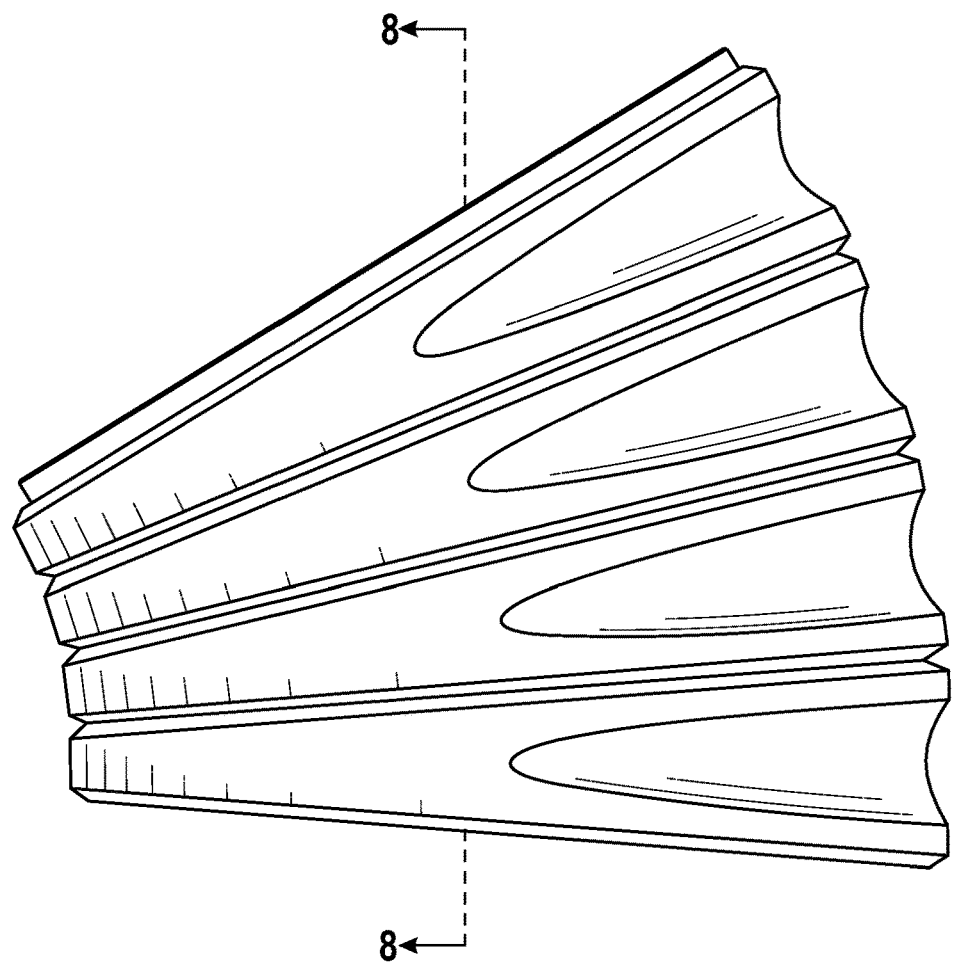
FIG. 7 is an isometric side view of the stack of FIG. 5 with section line B-B.

FIG. 7 is an isometric side view of the stack (8) of FIG. 5 with section line B-B. An exterior view of weld chamfer (9) on outside wall (4) is illustrated.

Figure 8:
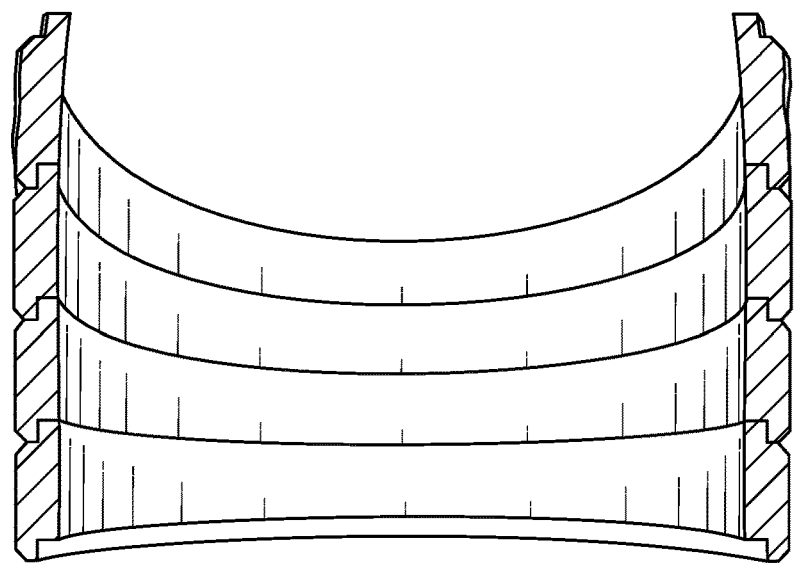
FIG. 8 is a sectional view along section line B-B of the stack of FIG. 5.

FIG. 8 is a sectional view along section line B-B of the stack of FIG. 5. Inside wall interlocking step (10) interlocks with outside wall interlocking step (11).

A consequence of the 4.5 degree angle cuts is that when the sections, also called pieces, are stacked as in FIG. 5, a curved portion of piping is produced. The tightness of the curved portion can be varied by changing the degree angle of the pie cuts such that a smaller angle pie cut produces greater diameter curved portion and a larger degree angle cut produces a smaller diameter curved portion. Circumferential cut out steps (6) and (7) result in the pieces interlocking when they are stacked, as seen in cross-section view of FIG. 8 as indicated by interlocked steps (10) and (11).

The seams between the sections can be sealed by welding or other suitable sealing means, depending on the material the pieces are fabricated from and the use to which the piping will be put.

By providing manufactured pie cut pieces, the present invention standardizes pie cut pipe bends. Additionally, shops that do not have the equipment or skill set to make pie cuts themselves have access to pie cut pieces so that they can be competitive with trends in the industry.

Many modifications and other embodiments of the prefabricated pie cut sections described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. One or more prefabricated pie cut pieces for assembling a curved pipe, each pie cut piece of the one or more pieces comprising:
   a narrow end and a wide end;
   an inside wall and an outside wall;
   an inside wall interlocking step;
   an outside wall interlocking step; and
   a decorative cut comprising a tear drop shape on the outside wall.

* * * * *